2 Sheets—Sheet 1.

W. E. FORSTER.

SOLE PRESSING MACHINE.

No. 11,480. Reissued Mar. 26, 1895.

Witnesses.

A. C. Harmon

Thomas F. Drummond

Inventor

William E. Forster by Crosby & Gregory Attys

2 Sheets—Sheet 2.

W. E. FORSTER.

SOLE PRESSING MACHINE.

No. 11,480. Reissued Mar. 26, 1895.

Witnesses.
A. G. Harmon.
Thomas S. Drummond.

Inventor:
William E. Forster,
by Crosby & Gregory Attys.

UNITED STATES PATENT OFFICE.

WILLIAM E. FORSTER, OF LYNN, MASSACHUSETTS.

SOLE-PRESSING MACHINE.

SPECIFICATION forming part of Reissued Letters Patent No. 11,480, dated March 26, 1892.

Original No. 478,420, dated July 5, 1892. Application for reissue filed June 28, 1894. Serial No. 516,018.

*To all whom it may concern:*

Be it known that I, WILLIAM E. FORSTER, of Lynn, county of Essex, State of Massachusetts, have invented an Improvement in Sole-Pressing Machines, of which the following description, in connection with the accompanying drawings, is a specification, like letters on the drawings representing like parts.

My invention relates to improvements in machines for beating out the soles of boots and shoes and other foot-wear, and it consists in the new and improved construction and arrangement of parts hereinafter particularly described in the specification, and pointed out in the claims.

Figure 1:
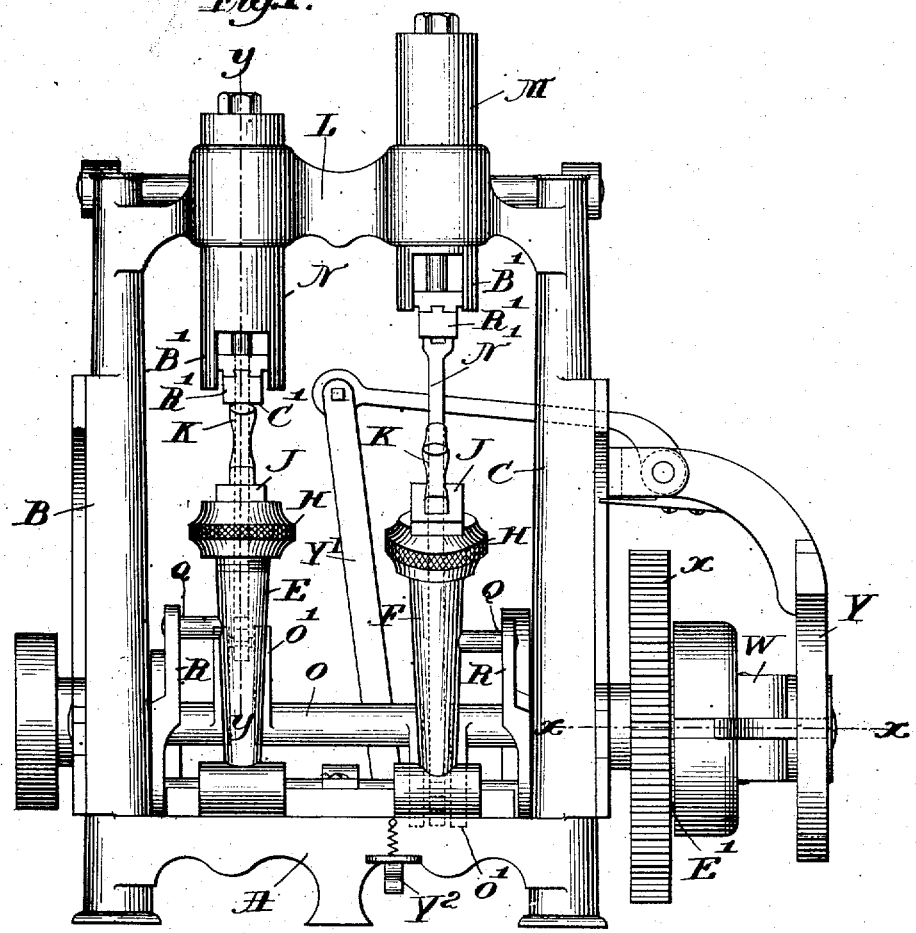
Figure 3:
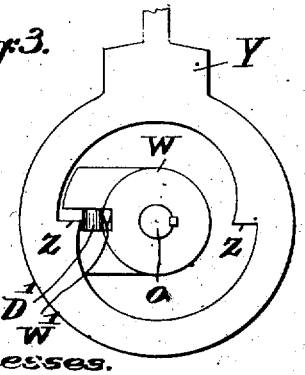
Figure 4:
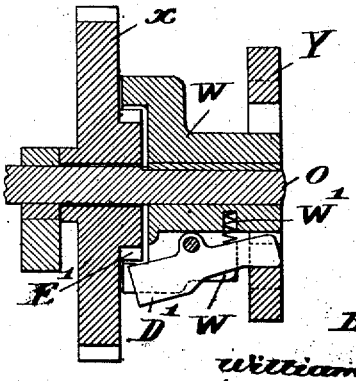
Figure 2:
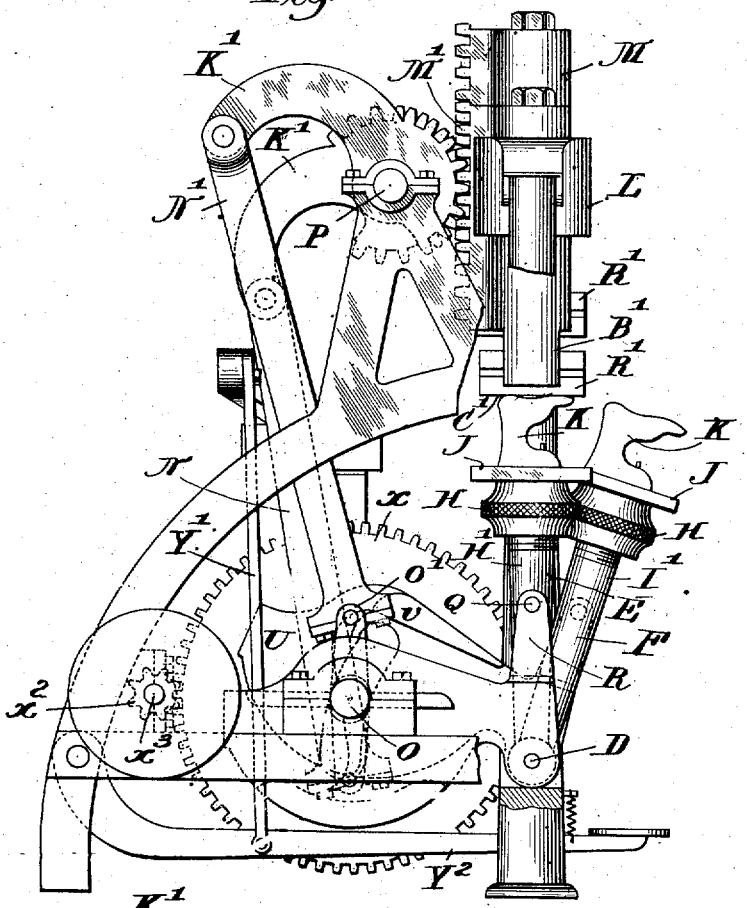
Figure 5:
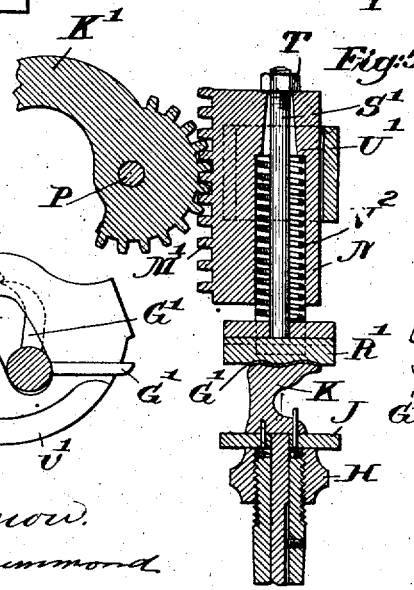
Figure 6:
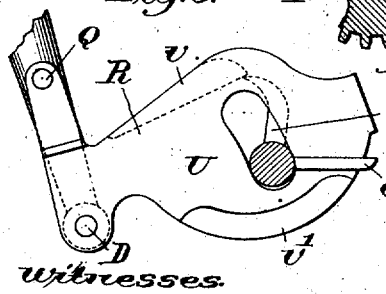
Figure 7:
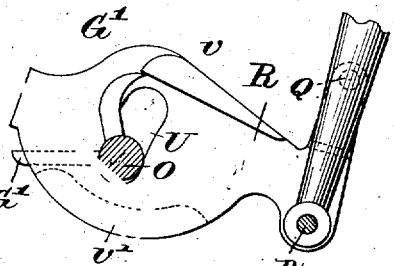

In the drawings which illustrate the invention, Figure 1 represents a front elevation of my machine. Fig. 2 represents an end elevation with parts broken away. Fig. 3 represents a detail of stop mechanism. Fig. 4 represents a section of stop mechanism on line $x$—$x$ of Fig. 1. Fig. 5 represents a vertical section on the line $y$—$y$ of Fig. 1; and Figs. 6 and 7 represent details of cam mechanism in combination with last-support.

In beating-out machines which have been heretofore constructed it has been necessary to procure the pressure required to beat out or level the sole of the boot or shoe after placing it upon the last by raising the portion of the machine bearing the last upward into contact with the mold, usually by means of toggle-links or like mechanism or by a circular motion of the mold and last.

My invention is designed to provide a machine which shall be much more simple, stronger and cheaper in construction and one which will give greater pressure than those heretofore constructed.

The invention, as shown, is a two-last machine and is adapted to automatically place a last with a boot or shoe upon it under pressure and at the same time throw out from under pressure the other last with its boot or shoe, thus enabling the operator to remove the shoe therefrom and place another thereon.

My machine consists of a frame-work A, having two perpendicular posts B and C, between which is a shaft D. Upon this shaft are pivotally secured two arms E and F. To each of these arms is pivotally connected at Q one arm of a bell-crank lever R, the angle of the bell-crank lever being pivotally mounted on the shaft D. Each of the arms E and F has upon its end farthest from the shaft a hand-wheel H, the hub of which is attached to its arm by screw-threads, so as to be adjustable lengthwise of the arm for the purpose of adjusting pressure. The upper edge or surface of the hub is smooth and adapted to receive the tables J, upon which the last, with boot or shoe, is placed, the said plates or tables being held in their position by means of arms extending downward therefrom into sockets in the ends of the arms E and F, adapted to receive the same. The perpendicular posts have near their upper portions and extending between them a cross-head L, adapted to receive and guide perpendicularly two plungers M and N.

Extending outward and backward from the perpendicular posts B and C is a portion of frame-work, in which is journaled the crank-shaft O, carrying the gear-wheel $x$, loosely mounted thereon, which is intended to mesh with and be operated by a pinion $x^2$ on a power-shaft $x^3$ in bearings farther back upon said frame-work and by which the motive power is transmitted to the machine, a suitable clutch mechanism being provided, as hereinafter described, for causing the wheel $x$ to connect with and turn the crank-shaft at desired times.

The levers R, secured, as stated, to the shaft D, extend backward and are loosely connected to the crank-shaft, as shown, and operated by a projection or eccentric carried by said crank-shaft, as hereinafter explained. This connection of the lever with the crank-shaft, as above referred to, governs the movement of the arm with its table and last support.

Figs. 6 and 7 represent opposite sides of one of the levers R as it engages with the crank-shaft. Upon each arm U of the levers R, above and below the crank-shaft, is provided a cam or projection $v$, $v'$. The crank-shaft carries the eccentrics G′ upon relatively-opposite sides of said shaft, these arms or eccentrics being adapted to engage with the cams on the upper and lower portions of the ends of the levers R as the shaft rotates, and thus alternately raise and lower the said ends and through the levers R to throw out first one arm with its last-supporting table and then the other, and thus while one arm is in a vertical position and directly under one of the plungers, as shown at H′, the other is inclined outward, as at I′, in such a position that the operator can remove the shoe therefrom and place another thereon. The plungers before referred to are adapted to be reciprocated in the cross-head directly over the pivot-point of the last-supporting arms, and may receive their motion from the crank-shaft by any desirable mechanism. I prefer to accomplish this, however, by means of the levers K′, pivoted on the shaft P and having each a segment-gear formed on its forward end engaging with like racks M′ on the backs of the plungers. The levers are operated alternately by means of the rods N′, which are connected pivotally therewith and are connected to the crank-shaft through the cranks O′, located opposite each other upon the shaft. Beneath the plungers, which are formed with an opening or passage-way extended through them lengthwise, are the forms R′, suspended loosely from said plungers by like rods S′, extending through them and secured in position by a nut or similar fastening T secured to the rod, preventing the rods dropping out, but allowing a certain amount of vertical movement of the same. The lower portion of the opening through the plunger is enlarged, so as to form a space around the rod, and in this space is placed a coiled spring $V^2$, between the shoulder U′ and the form-rest, this spring serving to graduate the pressure and aid in accomplishing the beating-out action. Extending downward from the plungers on either side of the forms are guides B′, which are adapted to prevent the rotation of the forms and guide them into the position shown at C′ upon a boot or shoe under pressure upon the last K.

Upon the crank-shaft outside of the frame-work and immediately adjoining the geared wheel thereon is a clutch mechanism (shown in Figs. 1, 3 and 4) with a clutch or ratchet-pawl D′ adapted to engage and disengage the geared wheel, and thereby respectively operate and stop the operation of the machine. The geared wheel has a collar formed integrally with or rigidly attached to its side, this collar having a series of teeth, as at E′, adapted to engage the pawl D′, before referred to. This pawl is mounted in line with the crank-shaft and is pivoted upon a small wheel or collar W, rigidly attached to the crank-shaft in such a position that the pawl will engage and disengage the teeth of the collar E′. The other end of the pawl extends outward from its pivot beyond the collar or wheel upon which it is pivoted and extends within a circular frame-work Y, having an inner cam-face with the two bosses or cams Z so arranged that the end of the pawl will come in contact with the cams when the machine is in operation. When the end of the pawl contacts with the inclined or beveled face of the cam, it is forced inward toward the shaft O, and its other end is thus disengaged from the teeth of the collar E′. As the geared wheel is loosely mounted upon the crank-shaft, as soon as the pawl is disengaged therefrom the wheel will rotate independently of the crank-shaft and will continue to do so while the outer end of the pawl is in engagement with the cam on the inner periphery of the circular frame, and the machine will at this time remain at rest. The cams or projections upon the frame are so placed that this period of rest will occur at the time when one or the other of the last supporting arms is directly under the corresponding plunger and the greatest amount of pressure is being applied thereby. To again clutch the gear-wheel to the shaft, it is necessary to disengage the outer end of the pawl from contact with the cam on the circular frame, and when this is done the coiled spring W′ embedded between the pawl and the wheel W, upon which it is pivoted, causes the inner end of the pawl to engage the teeth of the collar on the geared wheel and again start the machine, which will continue in motion until the outer end of the pawl comes in contact with the second cam on the frame and the machine is again stopped, at which time the positions of the last-supporting arms are reversed and the one previously under pressure is thrown outward, and vice versa.

In order to disengage the end of the pawl from the engaging cam, I have pivoted the frame Y upon the frame of the machine and provided an extension Y′, which is connected with a lever $Y^2$ beneath the machine and adapted to be operated by foot-power to swing the frame to one side and remove the cams thereof from contact with the pawl, and while the foot-lever is depressed the cams of the frame will be out of the path of the pawl as the shaft rotates, and the machine will continue in operation; but as soon as the said foot-lever is released the frame swings back to its normal position, and as soon as the pawl comes in contact with one of the cams the machine is again stopped, as before described. It will thus be seen that the operator has the machine entirely within his control and may time its movements at will to suit the conditions or requirements of the work.

The operation of my machine will be readily understood from the foregoing description. As has already been stated, when one last-supporting arm is in a vertical position and under pressure from the lowered plunger the other is inclined outward, as shown at I′, in position to have a boot or shoe placed thereon.

In operating the machine the last, with the boot or shoe to be beaten out or leveled, is placed upon the outwardly-inclined arm and the foot-lever $Y^2$ is depressed, which, as before stated, operates to release the pawl and clutch the geared wheel to the shaft, thus transmitting power to the crank or driving shaft of the machine and starting the movements thereof. The last, with its boot or shoe, is swung inward directly under its respective plunger, which descends upon it, and at the exact moment when the shoe is under the greatest amount of pressure the pawl upon the revolving shaft comes in contact with one of the cams, and, as before described, releases the geared wheel and stops the machine, and the boot or shoe must consequently remain under pressure until the machine is again started. Simultaneouly with the inward movement of one last-supporting arm the other has moved outward, and while the first is under pressure a shoe may be placed upon the second or the shoe to which pressure has been applied may be removed and a fresh one inserted in its place. The machine is then started, and the fresh boot or shoe is placed under pressure, while the one previously under pressure is thrown outward in position to be removed, and so the operation may go on uninterruptedly.

I claim—

1. In a beating-out machine, the following instrumentalities, viz:—two arms, each provided with a last to receive a boot or shoe the sole of which is to be pressed; two independent plungers provided with pressing forms, one for each last; a shaft, and devices between it and said arms and said plungers to automatically swing said arms alternately into and out of pressing position, and means to automatically change the relative position vertically of the said forms and lasts whereby boots or shoes to be pressed are alternately subjected to vertical pressure, substantially as described.

2. In a beating-out machine, the following instrumentalities, viz;—two arms, each provided with a last to receive a boot or shoe the sole of which is to be pressed; two independent plungers provided with pressing forms, one for each last; a shaft, and devices between it and said arms and said plungers to automatically swing said arms alternately into and out of pressing position, and to automatically reciprocate alternately said plungers, whereby as one last with a boot or shoe upon it is moved inwardly to be subjected to the direct pressure of a form, the other last with a boot or shoe on it is released from pressure and moved outwardly to enable the operator to remove the pressed shoe and place another shoe on the last to be pressed, substantially as described.

3. In a beating-out machine, the following instrumentalities, viz;—two arms each provided with a last to receive a boot or shoe the sole of which is to be pressed; two independent spring-supported plungers provided with pressing forms, one for each last; a shaft, and devices between it and said arms and said plungers to automatically swing said arms alternately into and out of pressing position, and to automatically reciprocate alternately said plungers, whereby as one last with a boot or shoe upon it is moved inwardly to be subjected to the direct pressure of a form, the other last with a boot or shoe on it is released from pressure and moved outwardly to enable the operator to remove the pressed shoe and place another shoe on the last to be pressed, substantially as described.

In testimony whereof I have signed my name to this specification in the presence of two subscribing witnesses.

WILLIAM E. FORSTER.

Witnesses:
GEO. W. GREGORY,
JOHN C. EDWARDS.